United States Patent [19]

Gray et al.

[11] Patent Number: 5,642,421

[45] Date of Patent: Jun. 24, 1997

[54] ENCRYPTION OF LOW DATA CONTENT ATM CELLS

[75] Inventors: James P. Gray, Chapel Hill, N.C.; Stephen M. Matyas, Poughkeepsie, N.Y.; Mohammad Peyravian, Cary, N.C.; Gene Tsudik, Thalwil, Switzerland

[73] Assignee: International Business Machines Corporation, Armonk, N.Y.

[21] Appl. No.: 528,822

[22] Filed: Sep. 15, 1995

[51] Int. Cl.⁶ ............................................. H04L 9/00
[52] U.S. Cl. ................................. 380/49; 380/9
[58] Field of Search .................................. 380/9, 49

[56] References Cited

U.S. PATENT DOCUMENTS 5,303,302  4/1994  Burrows ........................ 380/49
5,410,599  4/1995  Crowley ........................ 380/9

*Primary Examiner*—Thomas H. Tarcza
*Assistant Examiner*—Carmen White
*Attorney, Agent, or Firm*—Gerald R. Woods

[57] ABSTRACT

The security provided by encryption of ATM cells is enhanced by testing each cell for low data content level. If a cell has a low data content, its contents are nevertheless compressed and the resulting string is used to replace the original data. A length character and a randomly generated number which are added to the freed-up byte positions in the data field of the cell. The entire, modified data field is encrypted before the cell is transmitted. At a receiving system, a compression indicator is checked to determine whether the cell contains original or compressed data. If necessary, the length field and the random number are stripped and the remaining cell data is decompressed before the cell data is decrypted.

6 Claims, 8 Drawing Sheets

ENCRYPTION OF LOW DATA CONTENT ATM CELLS

FIELD OF THE INVENTION

The present invention relates to data communications and more particularly to a technique for enhancing the security provided by encryption of ATM (Asynchronous Transfer Mode) data cells which contain relatively little data.

BACKGROUND OF THE INVENTION

Data communication networks can be categorized as handling transfers of data on either a circuit-switched basis or a packet-switched basis. Where two users want to exchange data in a network which utilizes circuit switching, a path must be established through the network before the data exchange can begin. Once the path is set up, it continues to exist for the duration of the data exchange between the users. If the same two users were connected through a packet-switched network, it would not be necessary to set up and maintain a "circuit" between them. In a packet-switched network, user data is formatted in discrete data units or packets, each of which contains the routing information needed by intermediate systems or nodes to transfer the packet toward its intended destination over currently available links.

A type of packet-switching technology that is becoming increasingly pervasive is Asynchronous Transfer Mode (ATM) technology. In ATM networks, user data is formatted in fixed length cells, each of which includes a header field and a data field. The standard header field is five bytes in length and contains all necessary control and routing information for allowing the cell to be switched through the network toward its destination. The standard data field is forty-eight bytes long. The use of fixed length cells permits much of the necessary switching within the network to be carried out using specialized, high-speed hardware switches.

Users of any kind of data communication network, and not just ATM networks, are often concerned about concealing their data from eavesdroppers (sometimes called interlopers) on the network. Considerable time and effort has been spent developing cryptographic techniques which permit original data (sometimes referred to as plaintext or cleartext) to be encrypted or "scrambled" before it is transmitted as "ciphertext" through the network and then decrypted or returned to its original or plaintext form once it reaches the intended destination. Many encryption techniques employ "keys", which are values that control the encryption and decryption processes.

An illustration of an extremely simple, and largely ineffective, encryption approach is to replace each plaintext character in a message by a character "n" positions away in the alphabet, wrapping or returning to the beginning of the alphabet where the plaintext character is within "n" positions of the end of the alphabet. For example, if n=3, the plaintext word "safe" would translate to the ciphertext word "vdih". In this example, 3 would be considered the encryption key. As long as the party receiving the ciphertext message knows the encryption method and the key, recovery of the plaintext message is relatively simple.

Any effort by an eavesdropper to recover plaintext from an encrypted message is referred to as an "attack" on the message. Just as there are different kinds of encryption, there are different kinds of attacks aimed at discovering the key used to encrypt the plaintext data. Where a user must select the encryption key, it is human nature for that user to select an easily remembered key, such the user's own last name or the name of a favorite hobby; e.g., "golf" or "sailing". Eavesdroppers can take advantage of human nature by employing a "dictionary attack" in which names, English words (for example, all of the words in an unabridged dictionary), birthdays, etc. are tried as decryption keys to see if plaintext is generated. Where an eavesdropper knows the names of the sending and/or receiving parties or the time of transmission of the ciphertext message or other transmission-related information, a "traffic analysis attack" may be mounted by using such information in an effort to find the encryption key. More detailed information about the subject of cryptography is available from a number of references, including the book Bruce Schneier,"Applied Cryptography—Protocols, Algorithms and Source Code in C", John Wiley & Sons (19994). While the present invention is intended for use in networks in which cryptography is practiced, the invention can be understood without requiring any information from this book Where data is transmitted in fixed length cells, concerns about the security of encrypted data are heightened where the data field in a given cell contains relatively little data, for example, a single character response to an inquiry. Known types of attacks, such as dictionary attacks or traffic analysis attacks, can often be more effectively applied where the attacked cell has a relatively low data content.

SUMMARY OF THE INVENTION

The present invention relates to techniques for improving the effectiveness of cryptography where a cell being encrypted contains relatively little data. A known data compression technique is applied to each cell at its source to determine whether the data payload in the cell can be compressed by more than a threshold amount. If the data cannot be compressed by more than the threshold, the implicit conclusion is that the cell has a "high" data content. If the cell has a "high" data content level, the cell's plaintext data is replaced by ciphertext generated using a known encryption or ciphering technique before the cell enters the network. If, however, the data can be compressed by more than the threshold amount, an encryptable data unit is created to replace the cell's original data field. The encryptable data unit includes the string of compressed data, at least one length byte indicating the number of bytes in the compressed data string and a random seed or number which pads or fills the remaining byte positions in the encryptable data unit. The encryptable data unit is encrypted using the same encryption technique used for high data content cells and the resulting ciphertext is written into the cell prior to the cell's entry into the network.

BRIEF DESCRIPTION OF THE DRAWINGS

While the specification concludes with claims particularly pointing out and distinctly claiming that which is regarded as the present invention, details of the invention may be more readily ascertained from the following detailed description when read in conjunction with the accompanying drawings wherein:

DESCRIPTION OF PREFERRED EMBODIMENTS

Figure 1:
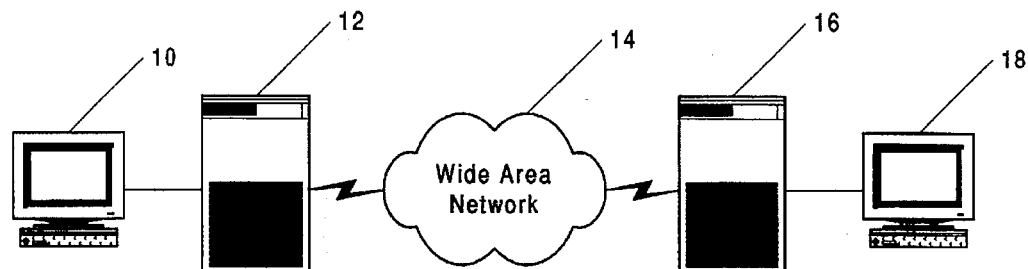
FIG. 1 is a simplified view of the major components of a network in which the present invention may be practiced.

In any data communication network, the ultimate objective is to be able to transport data from first user to a second user. While the term "user" is typically assumed to mean a human user, from a network standpoint, the actual data users are devices such processors, printers or even workstations, such as the workstations 10 and 18 shown in FIG. 1. The workstations 10 and 18 are connected to a shared wide area network 14 through intermediate communication processors 12 and 16, respectively. The functions performed by communication processors vary depending upon the characteristics of the wide area network and of the attached workstations. For example, if the wide area network 14 implements Asynchronous Transfer Mode protocols, a communication processor might handle the functions of segmenting data received from a workstation into a series of fixed length data cells and of generating a header for each cell with information needed to transfer the cell through the network. The same processor might operate on the source data to compress and/or encrypt that data. The counterpart processor at the receiver would reassemble the data into a format usable by the receiving workstation by decrypting and/or decompressing the data in received cells and by reassembling the data cells into longer data segments usable by the receiving workstation.

Figure 2:
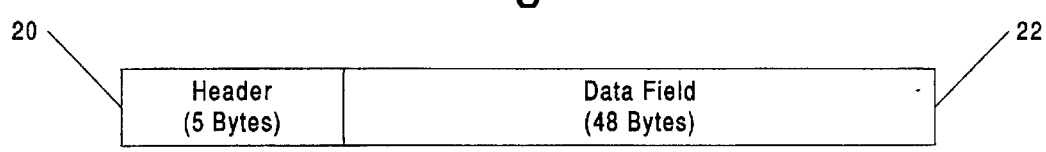
FIG. 2 shows the format of an Asynchronous Transfer Mode (ATM) cell.

Referring to FIG. 2 and as noted earlier, a standard ATM cell includes a five byte header field 20 which contains control and routing information for the cell and a forty-eight byte data field 22 which contains the actual user data and possibly an error checking character. While use of the invention, as described below, may cause the contents of either or both of the header and data fields to be altered, the same basic five byte header and forty-eight byte data structure is maintained at all times within the network.

Figure 3:
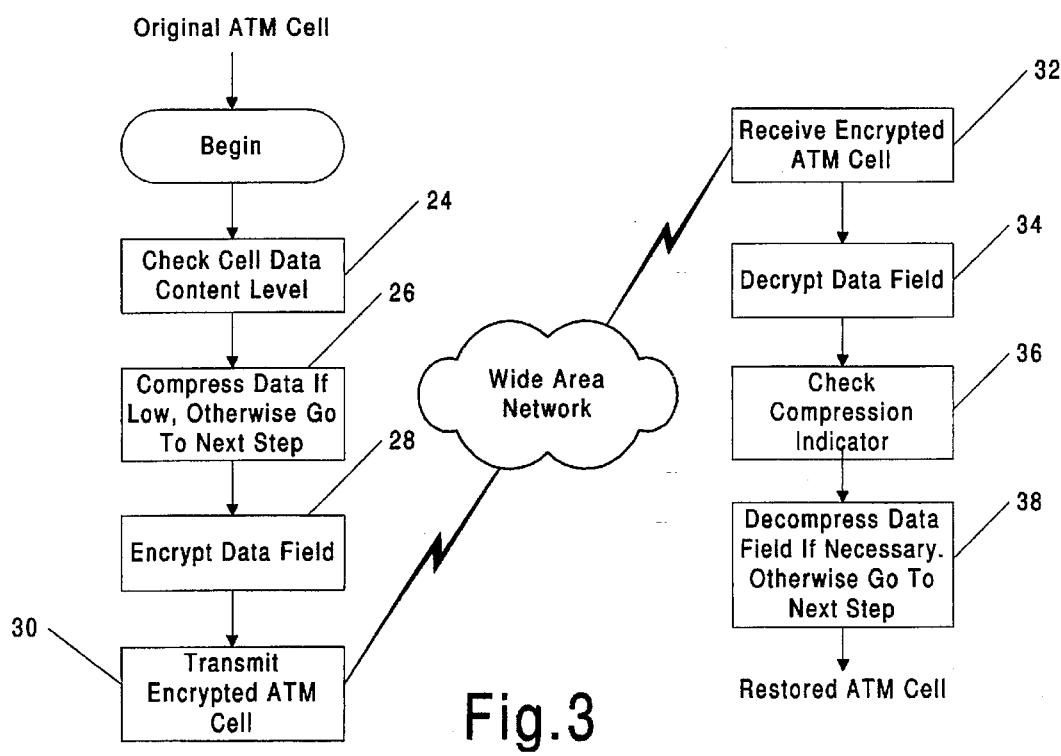
FIG. 3 is a simplified view of operations that occur during use of the present invention.

FIG. 3 is a high level flow chart of operations that enhance the security of ATM cells having relatively low amounts of data. The operations, typically carried out in processors such as 12 and 16, begin with the original ATM cell. The data content level of each cell is checked in an operation 24 by applying a known data compression technique, such as run length coding, on a trial basis. If the trial data compression shows that the cell's data payload can be compressed by more than a predetermined threshold amount, which indicates a low data content level, the byte string representing the compressed data is written into the cell's data field in place of the original data. Length and compression indicators (to be described later) are added to the data field. If, on the other hand, the trial data compression shows that the cell's data is not sufficiently compressible, then the data is left in its original form. All of these operations are represented by block 26. The modified data field resulting from these operations is encrypted in an operation 28 and concatenated with the cell's original header before being entering the network in an operation 30.

When each cell is received from the wide area network (operation 32) at a destination system, its data field is decrypted (operation 34) and the compression indicator is checked (operation 36) to see if the data had been compressed at the source. If necessary, the data is decompressed in an operation 38. The output of operation 38 is the restored, original ATM cell.

Figure 4:
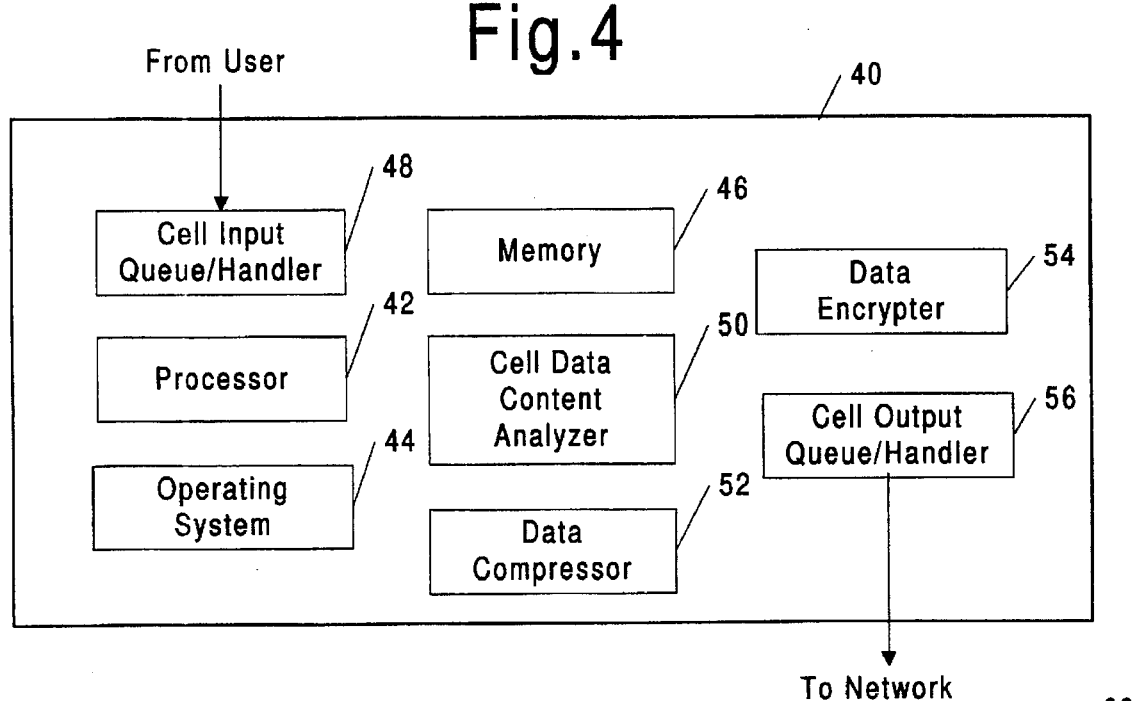
FIG. 4 shows the major functional components of a node or system that is capable of performing operations set forth in FIG. 3 on a cell to be transmitted through an ATM network.

The functions described in general terms above and to be described in detail later can be implemented either in software executed by a general purpose processor or as firmware or microcode written for a special purpose processor. In either case, some hardware, such as buffer registers or memory is employed in the course of the process. FIG. 4 is a block diagram of functional components required to implement the invention at a source system 40. The source system 40 necessarily includes a processor 42 which operates under the control of an operating system 44 as well as memory components 46 for storing both data and program instructions, at least on a temporary basis. The source system 40 also includes a cell input queue/handler 48 for storing and formatting data received from an originating user. Assuming the user itself does not provide data in the standard ATM format, queue/handler 48 would transform the input data to standard ATM fixed length cells, including generating the necessary header field for each cell. The invention requires that the data content of the cell be evaluated (functional component 50) by applying a known data compression technique (functional component 52). Whether a cell contains compressed or original data, a data encrypter (functional component 54) is used to encrypt the data payload of the cell before delivering the encrypted cell to a transmit cell queue/handler component 56 at the boundary with the network.

Figure 5:
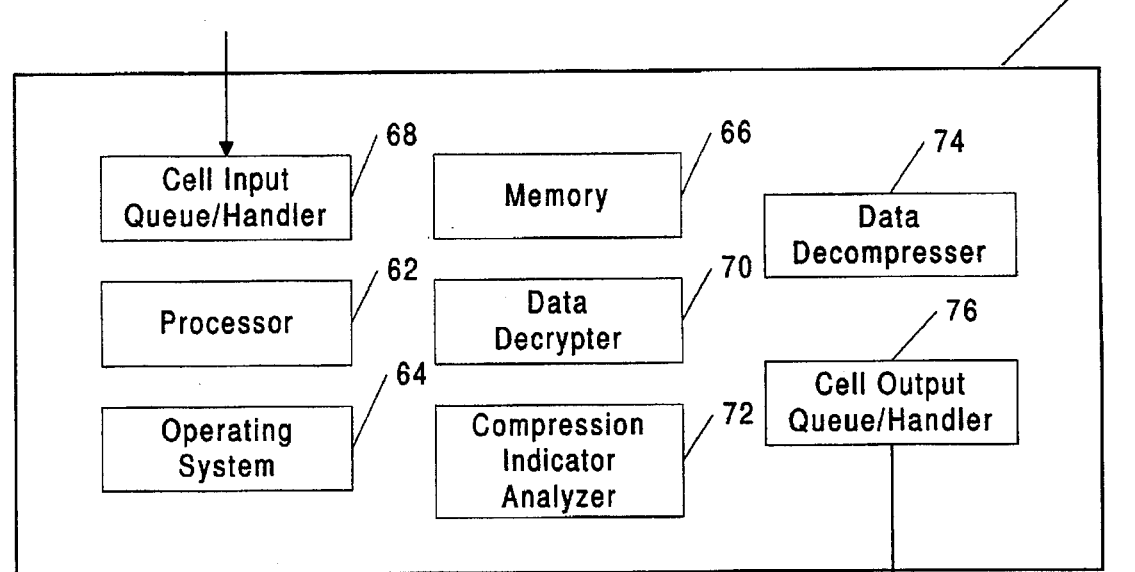
FIG. 5 shows the major functional components of a node or system that is capable of performing operations set forth in FIG. 3 on a cell received from an ATM network.

Referring to FIG. 5, a destination system 60 has a number of components with counterparts in a source system. For example, any destination system also includes a processor 62, an operating system 64 and memory 66. In fact, the same system ordinarily can operate either as a source system or a destination system at different times, which means that the same processor or operating system or memory will perform source or destination functions at different times. A destination system includes a received cell queue/handler 68 for receiving ATM cells from the wide area network and a data decrypter 70 for decrypting the data payload of each cell. Once the data has been decrypted, an analyzer 72 can check the cell to determine whether the data exists in compressed or original form. The details of this analysis are provided later. Assuming the data exists in compressed form, a data compressor 74 decompresses the data to restore the ATM cell to its original form. A cell output queue/handler 76 exists to provide cell handling at the interface to the user at the destination system.

Figure 6:
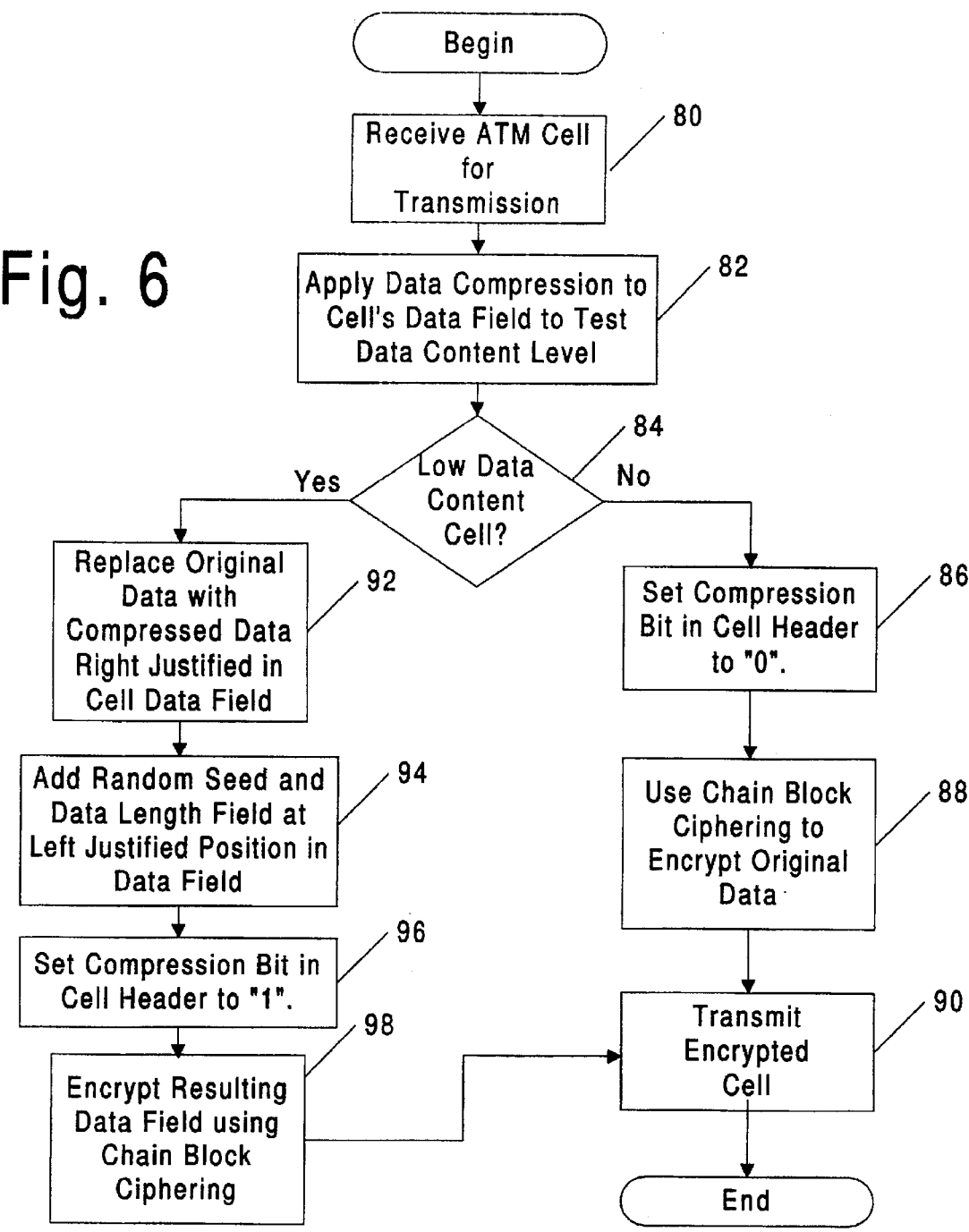
FIG. 6 is a detailed flow chart of operations that are performed on an ATM cell at a source system.

FIG. 6 is a flow chart of steps that are performed in processing an ATM cell at a source system. Once an ATM cell is received (operation 80) for transmission, the data contained in the forty-eight byte data field is compressed on a trial basis (operation 82) using a known data compression technique, such as run length coding. Run length coding is identified only as an example. Other known compression techniques can be used as long as the corresponding decompression techniques are implemented at destination systems. A check 84 is then made to determine whether the data compressed by more than a predetermined threshold amount. This amount can either be expressed as a ratio (number of bytes of original data/number of bytes required to represent the data in compressed form) or as a minimum difference between the number of bytes of original data and the number of bytes of corresponding compressed data.

If check 84 shows that the data compression threshold is not met, in a preferred embodiment of the invention a single compression-indicating bit in the cell header is set to a "0" value in an operation 86 and the cell's data (still in its original form) is encrypted (operation 88) using a known encryption technique. In a preferred embodiment of the invention, chain block ciphering is employed to encrypt the data payload. Chain block ciphering is well known and need not be described in detail. In general terms, chain block ciphering consists of segmenting the data to be encrypted into a series of blocks and encrypting the data one block at a time. For each data block following the first block, the results of the encryption of the prior data block are factored into the encryption process. While the use of chain block ciphering is preferred, other encryption techniques could readily be used in implementing the present invention.

If check 84 had shown that the data field of the cell being processed had low data content, then the creation of an encryptable forty-eight byte data unit is begun by writing the byte string resulting from the compression operation into a right justified position in the data field (operation 92). The compression operation leaves unoccupied byte positions adjacent the left boundary of the data cell. A length byte or bytes is written (operation 94) into this area. The length byte or bytes identifies the number of bytes in the compressed byte string. A random seed or number is written into the remaining unoccupied byte positions in the cell to complete the operation 94. For reasons which will become apparent later, it is not necessary that the system be aware of how this random number is generated. The compression indicator bit in the cell header is set to "1" in operation 96 and the data unit is encrypted (operation 98).

The encrypted (and possibly compressed) cells resulting from either of operations 88 or 98 enter into the wide area network (operation 90) at this point.

Figure 7:
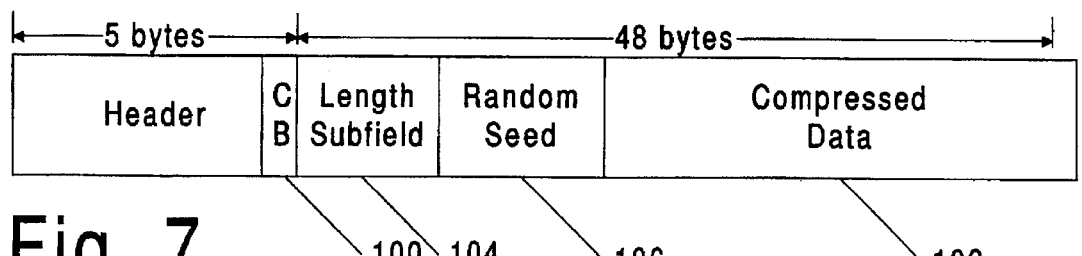
FIG. 7 is a schematic representation of a cell that results from some of the operations of the process set forth in FIG. 6.

FIG. 7 depicts the encrypted, compressed cell which results from operations 92, 94, 96 and 98. The single compression indicator bit (CB) 100 is shown right justified in the five byte header field for illustrative purposes only. The bit could be included in any number of byte/bit positions within the field. The length subfield 104, the random seed or number 106 and the compressed data are shown in their preferred positions in the data field. Under some conditions, the subfields could be rearranged without changing the fundamental process. For example, the random seed could be right justified in the data field, leaving the compressed data bracketed by the length subfield and the random seed.

Figure 8:
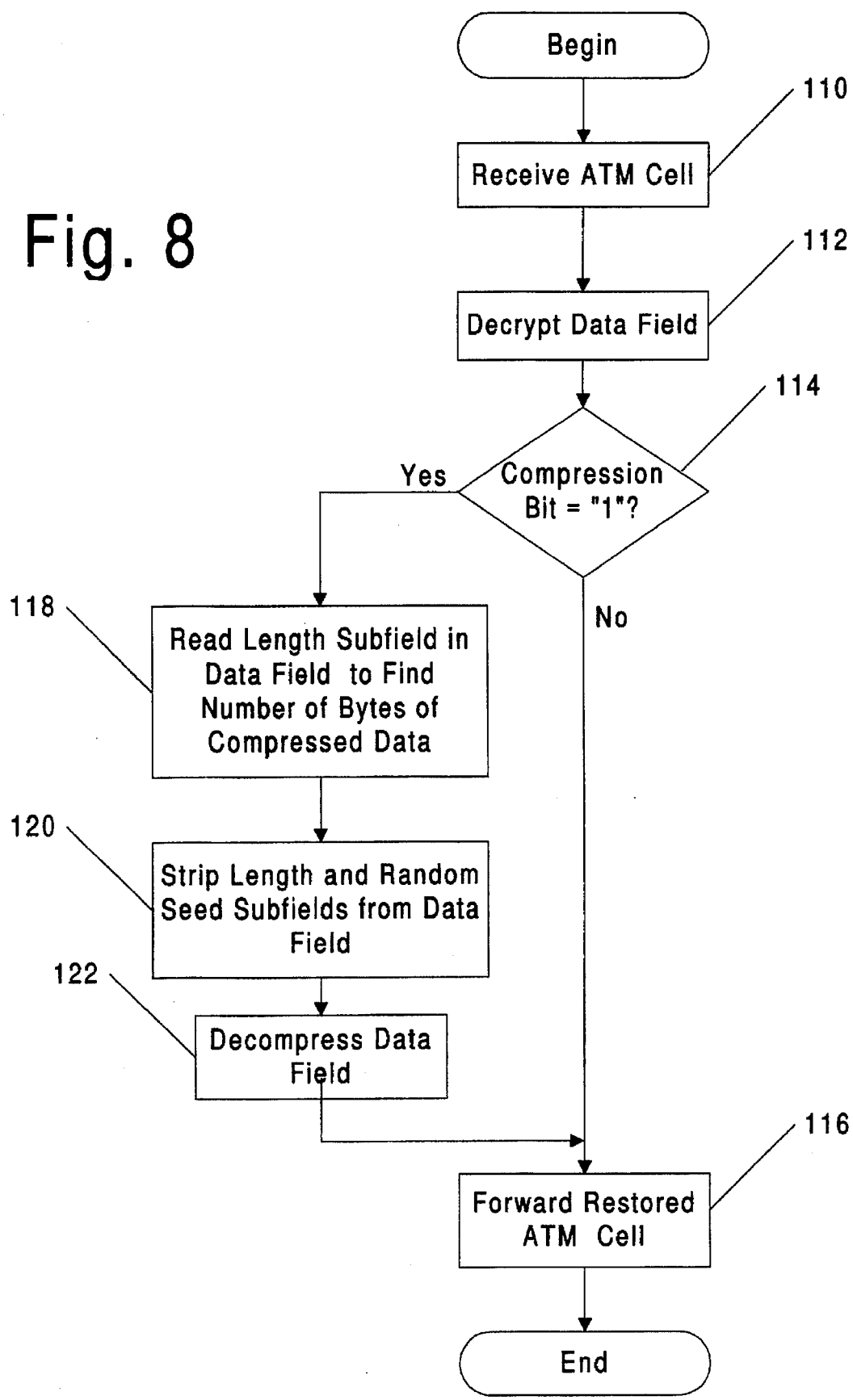
FIG. 8 is a detailed flow chart of operations that are performed when a cell is received at a destination system.

FIG. 8 is a flow chart of steps that are performed when an ATM cell, processed in accordance with the FIG. 6 process, is received at a destination system in an operation 110. The data field of the received cell is decrypted (operation 112) and the value of the compression indicator bit in the header is checked in an operation 114. If the bit value is "0", meaning that the data was not compressed at the source system, the cell can be forwarded to a user immediately in an operation 116 since it is restored to its original form by the decryption operation 112 alone. If, however, check 114 shows the compression bit is "1", meaning the original data was compressed at the source, then the destination system must (in an operation 118) read the length subfield to determine the number of bytes of compressed data carried in the cell's data field. Once the number of bytes of compressed data is known, the length and random seed subfield values can be stripped from the data field in an operation 120, leaving only the compressed data to be decompressed in an operation 122. The cell resulting from these operations is restored to its original form and can be forwarded to a user in operation 116.

Figure 9:
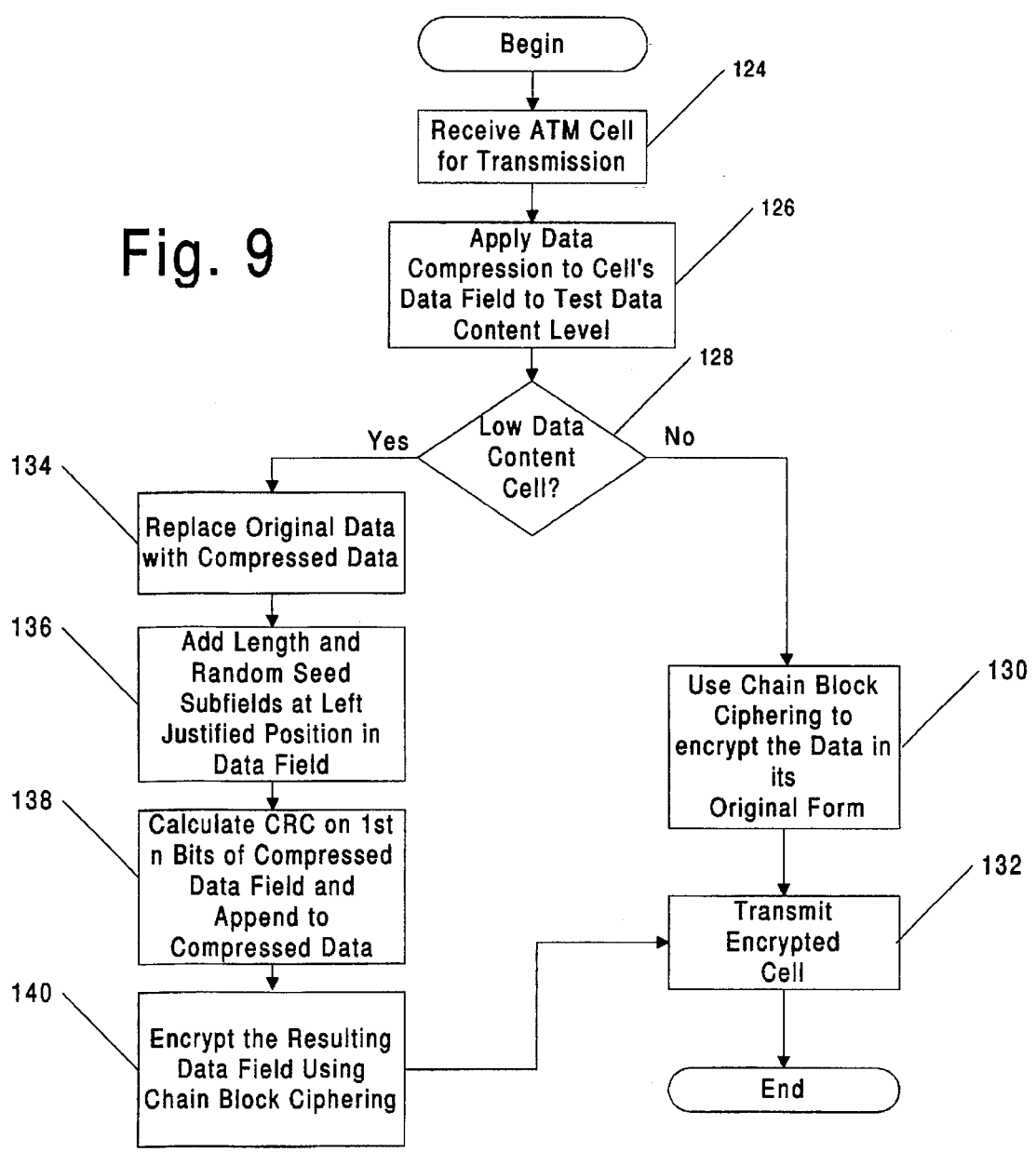
FIG. 9 is a detailed flow chart of operations that are performed at a source system in accordance with an alternate embodiment of the invention.

In an alternate embodiment of the invention, it is not necessary to modify the cell header in order to indicate whether compression has occurred. In the alternate embodiment, a Cyclical Redundancy Check (CRC) string can be used as a compression indicator. The term "string" is used since a CRC value may or may not be one byte or character in length. Referring to FIG. 9, the process at the source system begins when an ATM cell is received (operation 124). As in the earlier embodiment, a known data compression routine is applied to each cell's data field (operation 126) to test for low data content level. If the cell is found to have a high data content, the cell data is encrypted in operation 130, using a known encryption technique such as chain block ciphering. The cell, consisting of the original unmodified header field and the encrypted data field is then transmitted (operation 132) into the network.

Where, however, check 128 indicates the cell has a low data content level, the original cell data is replaced (operation 134) with the data string resulting from the compression operation 126. The compressed data string may be right justified in the cell with bit positions being reserved at the right boundary of the cell for a CRC string to be generated as described below. A length subfield and a random seed are added to each cell (operation 136) to occupy byte positions, preferably those to the left of the compressed data string. A CRC string is then calculated (operation 138) over the first "n" bits of the data field. The CRC string value is, of course, dependent upon the contents of the length subfield and the random number as well as the compressed data. The CRC value is written into the data field, preferably following the string of compressed data. The entire data field, consisting of the length subfield, the random seed subfield, the compressed data string and the CRC string, is then encrypted in an operation 140 and the cell is transferred (operation 132) into the network.

Figure 10:
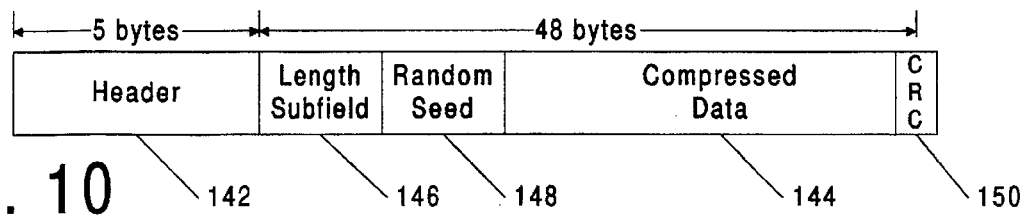
FIG. 10 is schematic representation of a cell that results from some of the operations of the process set forth in FIG. 9.

FIG. 10 represents the ATM cell which is generated by the series of operations beginning at compression operation 126 and ending at encryption operation 140. The original five byte header field 142 is not altered in any way by these operations. The original forty-eight byte data field now, however, contains a length subfield 146, a random see 148, the string 144 of compressed data and a CRC string 150.

Figure 11:
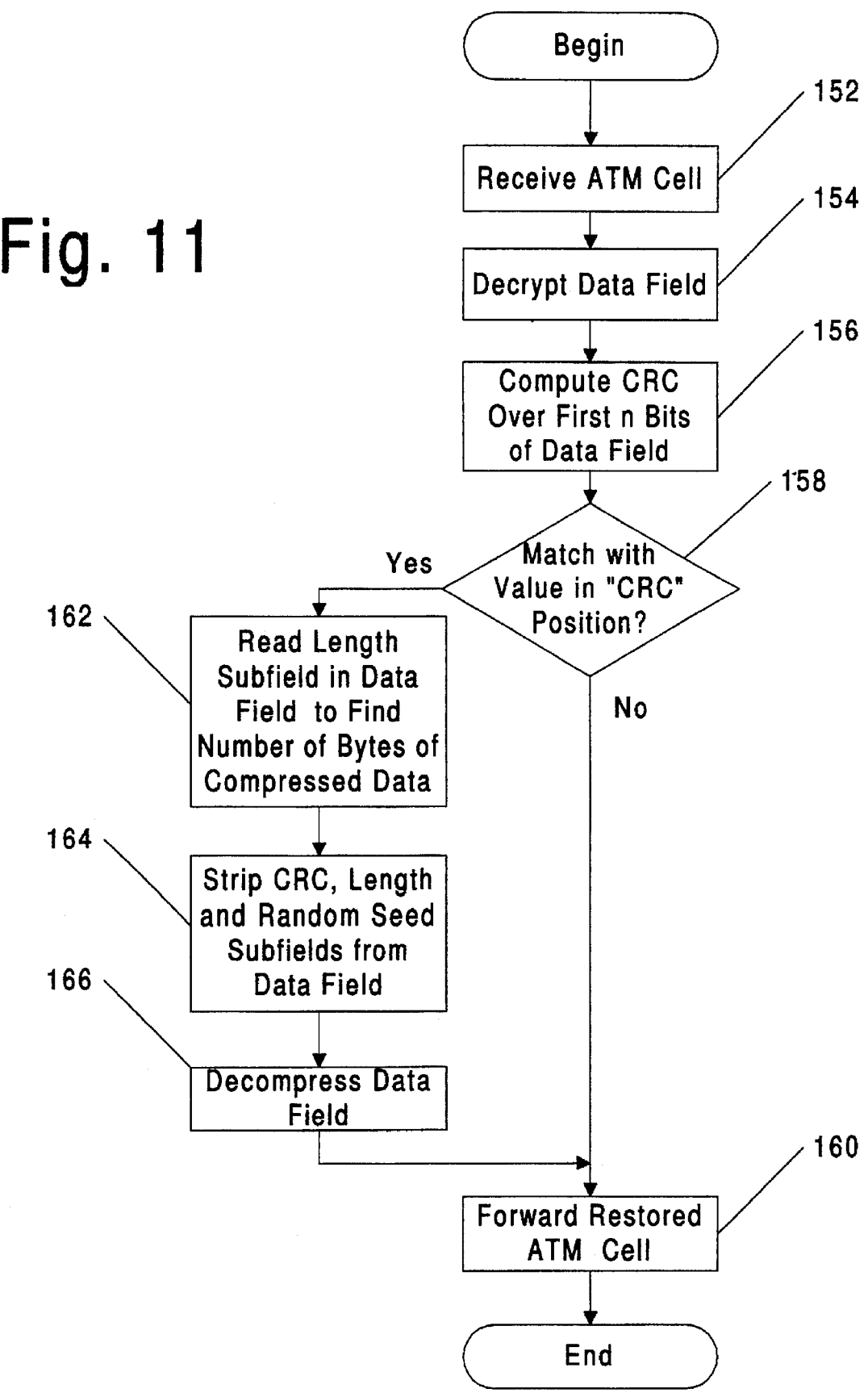
FIG. 11 is a detailed flow chart of operations that are performed at a destination system where the alternate embodiment of the invention is implemented.

FIG. 11 shows that operations that are performed on a cell once it is received (operation 152) at a destination system implementing the alternate embodiment. The data field is immediately decrypted (operation 154) and a CRC character calculated (operation 156) over the first "n" bits of the data field. The value of the calculated CRC string is then compared (operation 158) to the value found in the cell bit positions in which a CRC string, if one existed, would be expected to be stored. For the sake of convenience, these cell bit positions are referred to as the CRC positions. Where no data compression is performed at the source system, no CRC string is even generated and the calculated CRC string is unlikely to match bit values stored in the CRC positions. A mismatch is taken as meaning that data compression was not performed at the source system. In the absence of compression at the source the decryption operation alone is sufficient to restore the original ATM cell, which can be forwarded (operation 160) to a user.

If, however, operation 158 revealed that the calculated CRC string matched the bit values stored in the CRC positions in the cell, then the length subfield in the received cell is read (operation 162) to determine the length of the compressed data byte string. The length subfield, the random seed and the CRC string are then stripped from the data field in operation 164. Where the CRC positions are at the right boundary of the cell, the remaining data may be right shifted into the CRC positions. The remaining data is then decompressed (operation 166) to complete the restoration of the ATM cell to its original form.

Figure 12:
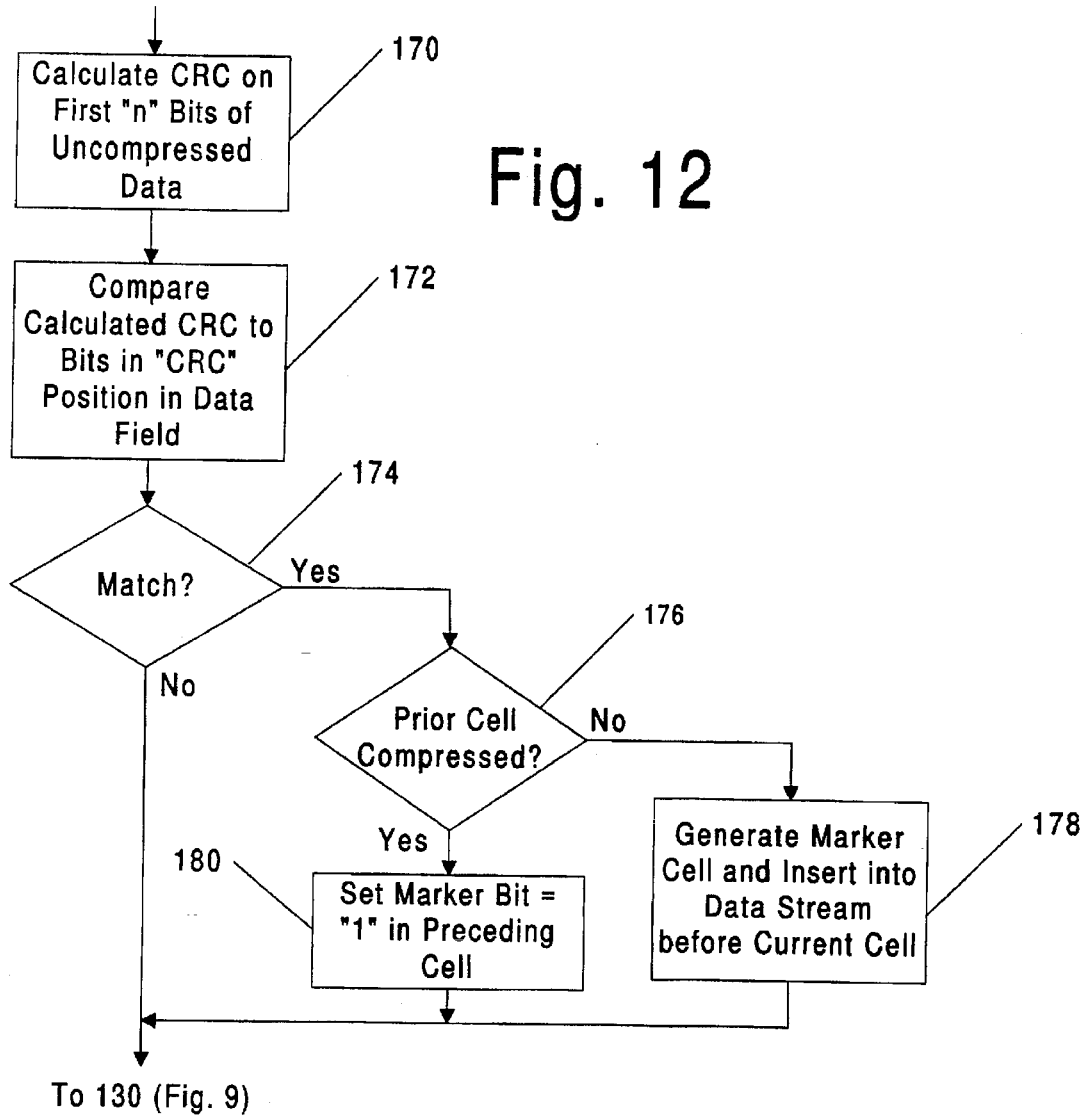
FIG. 12 is a partial flow chart showing steps that can be added to the process of FIG. 9 to include generation of marker cells as part of the encryption process.

In the alternate embodiment of the invention, there is a slight possibility that the CRC string calculated at the destination system will match an uncompressed data stored in the CRC positions in the received cell. One way to deal with this possibility is illustrated in FIG. 12, which represents steps that would be added to the compression/encryption process already described with reference to FIG. 9. Where a cell being processed has a high data content, a CRC string based on the first "n" bits of the uncompressed data is calculated (operation 170) and the result is compared (operation 172) to the string of bit values in the CRC position in the data field. If, by coincidence, a match is found (operation 174), a marker cell can be generated for inclusion in the data stream preceding the cell to be marked. This marker cell has a unique format which a receiving system will recognize and interpret as meaning the following cell should be treated as a cell containing uncompressed data.

Figure 13:
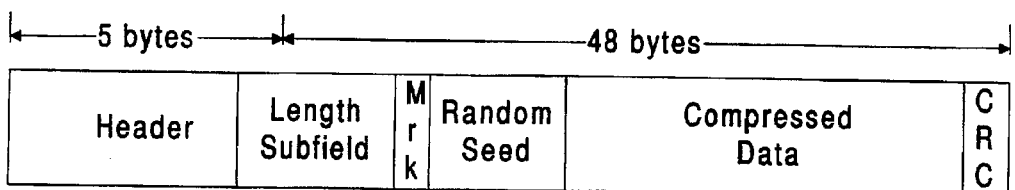
FIG. 13 is schematic representation of a cell that results from the operations of the process set forth in FIG. 12.

Referring momentarily to FIG. 13, a marker cell can be identified by a single bit field 200 in the data field of an ATM cell having the general format of a compressed cell. A bit value of "1" in the single bit field would identify the cell as a marker cell while a bit value of "0" would indicate the cell was not intended to function as a marker cell. Since the data fields of compressed cells are already modified as a result of the compression/encryption process, any compressed cell can be made to serve as a marker cell for a following uncompressed cell by the simple expedient of setting the compressed cell's marker bit to "1".

Referring now back to FIG. 12, a check 176 is made to determine whether the cell preceding the cell for which a marker cell is needed is a cell in which the data has been compressed. If data in the preceding cell is compressed, the cell is converted to a marker cell in an operation 180 by setting the marker bit to "1". Otherwise, a special marker cell having the general format of a "compressed" cell is generated in an operation 178 and inserted into the data stream preceding the cell to be marked. Since this special marker cell won't contain any useful data, a zero value can be written into the length field to distinguish this special marker cell from a data-bearing marker cell. The process reverts back to the input to the encryption block 130 of FIG. 9 at this point.

Figure 14:
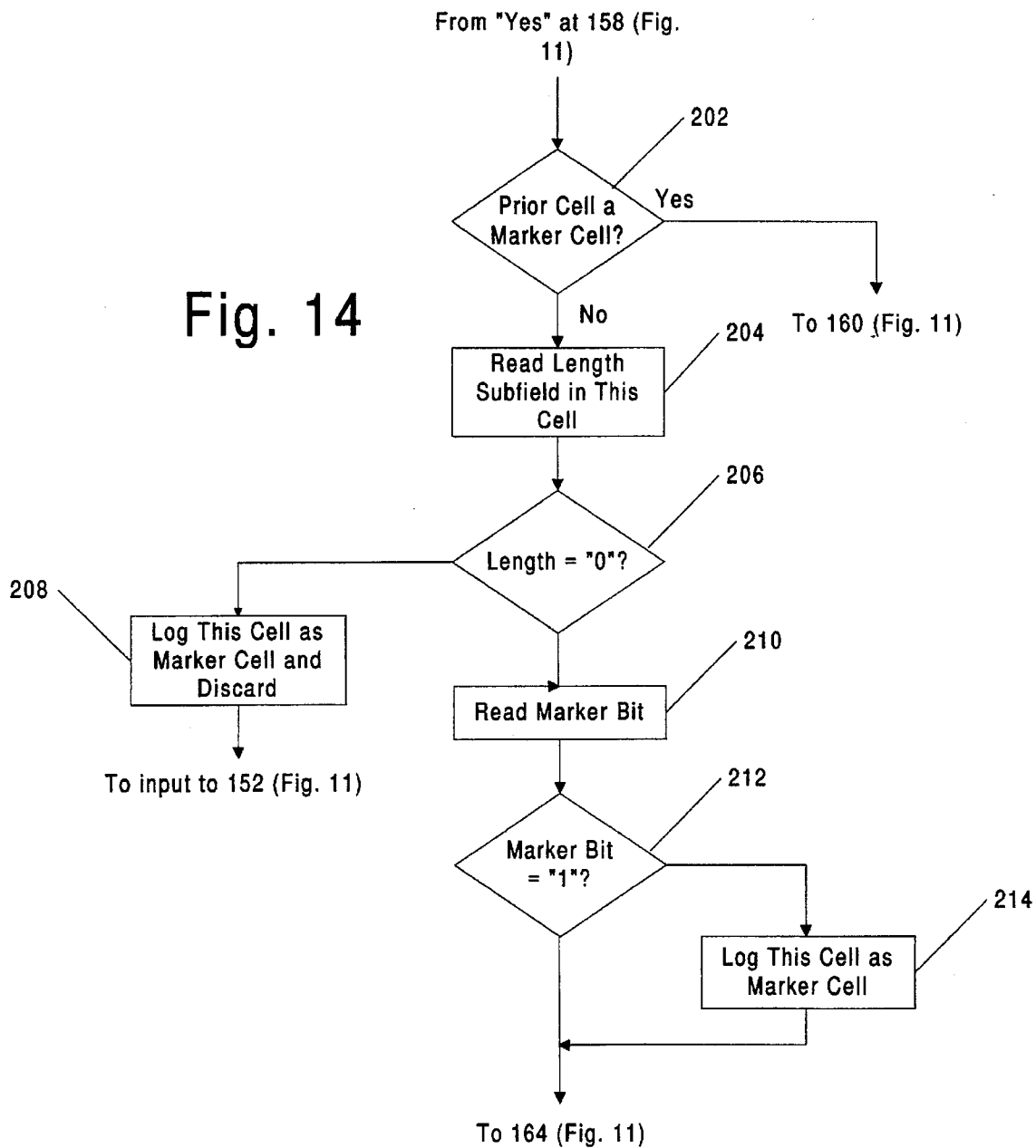
FIG. 14 is a partial flow chart of steps which must be added to the process set forth in FIG. 11 in order to deal with received cells generated in according with the process described with reference to FIG. 12.

FIG. 14 illustrates the modifications which must be made to the cell-receive process previously described with reference to FIG. 11 in order to deal with the use of marker cells. If operation 158 in the FIG. 11 process indicated a match between the CRC string calculated at the receiving station and the bit string stored in the CRC position in the data field and marker cells are being used, then the operations shown in FIG. 14 are invoked. In operation 202, a check is made to determine whether the prior cell in the data stream was designated as a marker cell by writing a "1" value into the marker bit position. It is implicit that a destination system must, on a cell-by-cell basis, be able to recognize marker cells and maintain a record as to whether at least the immediately preceding cell was one. The steps required to do this are described below.

If the prior cell is identified as a marker cell in operation 202, then the current cell is taken to be a cell carrying uncompressed data in which the CRC string only coincidentally matches the bit string stored in the cell CRC positions. Since a cell carrying uncompressed data is fully restored to its original form by the decryption operation alone, program control can immediately be returned to operation 160 in FIG. 11 under which the restored cell is forwarded to the destination user.

If the prior cell was not a marker cell, there is still the possibility that the current cell is a marker cell which may or may not carry user data in its data field. To determine whether a current cell is a non-data-bearing, special marker cell, the length subfield in the cell is read in an operation 204. If check 206 finds a length subfield with a "0" stored value, the cell is assumed to be a special marker cell to be used only in controlling the receive processing for the next cell to be received. The existence of the special marker cell can be logged in operation 208. Since the cell carries no other useful data, it can be discarded as part of the operation to allow the system to receive and begin processing the following cell.

If check 206 revealed a non-zero value in the length subfield, a further check must be made to determine whether the current cell is a compressed data cell which also serves as a marker cell for the following cell in the data stream. The marker bit in the data field is read in an operation 210 and a determination 212 is made as to whether the marker bit is set to "1". If the marker bit is set to "1", the cell as logged as a marker cell in an operation 214 before regular cell processing continues at operation 164 in the process described with reference to FIG. 11. If the marker bit is set to "0", the cell is assumed not to serve a marker cell function and program control returns immediately to operation 164. The marker bit is, of course, one of the bits stripped from the cell in the course of operation 164, leaving only compressed data to be decompressed.

Alternatively, it may be preferable to use special marker cells any time an uncompressed cell must be marked. The consistent use of special marker cells is advantageous in that the CRC string for the cell being marked can be written into the special marker cell as the cell is being generated. At the destination system, the CRC string written into the marker cell can be compared to the CRC calculated over the first n bits of the marked cell to make sure the two match before the marked cell is processed as an uncompressed cell. This additional matching operation reduces the chances that a cell arriving out of sequence will be incorrectly treated as a marked cell.

While preferred embodiments of the invention are described, variations and modifications will occur to those skilled in the art once they become aware of the basic inventive concepts. Therefore, it is intended that the appended claims shall be construed as covering the preferred embodiments and all such variations and modifications as fall within the true spirit and scope of the invention.

What is claimed is:

1. For use in a data communication network in which data is transported in fixed length cells comprising a header field and a data field, a method of improving security for cells containing less than a threshold amount of data, the method comprising the steps of:
   a) applying a known data compression technique to the cell data to produce a multiple-byte compressed data string;
   b) comparing the number of bytes in the compressed data string to the number of bytes of original data to determine the compression ratio resulting from the application of the data compression technique;
   c) where the compression ratio is less than a predetermined threshold, encrypting the original data and writing the encryption result into the data field of the cell;
   d) where the compression ratio equals or exceeds the predetermined threshold,
      creating an encryptable data unit, the data unit having the same number of bytes as the cell data field and comprising the multiple-byte compressed data string, at least one length byte indicating the number of bytes of compressed data, and a random number, encrypting the encryptable data unit, and
      writing the encryption result into the data field of the cell.

2. A method as set forth in claim 1 including the further step of establishing an indicator in the cell, the value of said indicator being dependent on whether the cell data was compressed prior to encryption.

3. A method as set forth in claim 1 wherein multiple-byte compressed data string is right justified within the encryptable data unit and the length byte and random number are left justified within the encryptable data unit.

4. A method as set forth in either of claims 2 or 3 wherein the compression indicator comprises at least one bit in the header portion of the cell, said at least one bit having a first value where no data compression has been performed and a second value where data compression has been performed.

5. For use in a data communication network in which data is transported in fixed length cells comprising a header field and a data field, a method of exchanging data between a user at a source and a user at a destination using cells having improved security for cells containing less than a threshold amount of data, the method comprising the steps of:
   a) at the source, generating an encrypted form of each data cell provided by the user by
      1) applying a known data compression technique to the cell data to produce a multiple-byte compressed data string;
      2) comparing the number of bytes in the compressed data string to the number of bytes of original data to determine the compression ratio resulting from the application of the data compression technique;
      3) where the compression ratio is less than a predetermined threshold, encrypting the original data, writing the encryption result into the data field of the cell and setting an indicator within the cell to indicate the cell data has not been compressed;
      4) where the compression ratio equals or exceeds the predetermined threshold, creating an encryptable data unit, the data unit having the same number of bytes as the cell data field and comprising the multiple-byte compressed data string, at least one length byte indicating the number of bytes of compressed data, and a random number, encrypting the encrypting the encryptable data unit, writing the encryption result into the data field of the cell and setting an indicator within the cell to indicate the cell data is compressed
   b) transmitting the encrypted form of each data cell through the network to the destination;
   c) at the destination,
      1) receiving the encrypted from of each data cell,
      2) decrypting the data field in each received cell,
      3) checking the compression indicator to determine whether the cell data was compressed,
      4) if the cell data was not compressed, forwarding the cell, including the decrypted data, to the user,
      5) if the cell data was compressed, reading the length subfield in the decrypted data field to determine the number of bytes in the compressed data string, stripping the length subfield and the random number subfield from the data field, decompressing the compressed data string, and forwarding the cell, including the decrypted and decompressed data to the user.

6. In a data communication network in which data is transported in fixed length cells comprising a header field and a data field, an encryption device for improving security for cells containing less than a threshold amount of data, the encryption device comprising:
   a) a data compressor for compressing a cell's data to produce a multiple-byte compressed data string;
   b) a data content analyzer for comparing the number of bytes in the compressed data string to the number of bytes of original data to determine whether the cell has a low data content level;
   c) a data encrypter for
      where the cell is determined to have a high data content level, encrypting the original data and writing the encryption result into the data field of the cell;
      where the cell is determined to have a low data content level, for creating an encryptable data unit, the data unit having the same number of bytes as the cell data field and comprising the multiple-byte compressed data string, at least one length byte indicating the number of bytes of compressed data, and a random number, for encrypting said data unit, and for writing the encryption result into the data field of the cell.

* * * * *